US010364926B2

(12) United States Patent
Taft et al.

(10) Patent No.: US 10,364,926 B2
(45) Date of Patent: Jul. 30, 2019

(54) ENDCAP FOR DRY PRESSURE INSERTION PROBE

(71) Applicant: Veris Industries, LLC, Tualatin, OR (US)

(72) Inventors: Mark S. Taft, Tualatin, OR (US); Jeffrey Leslie, Tualatin, OR (US)

(73) Assignee: Veris Industries, LLC, Tualatin, OR (US)

( * ) Notice: Subject to any disclaimer, the term of this patent is extended or adjusted under 35 U.S.C. 154(b) by 112 days.

(21) Appl. No.: 15/630,058

(22) Filed: Jun. 22, 2017

(65) Prior Publication Data

US 2018/0066782 A1 Mar. 8, 2018

Related U.S. Application Data

(60) Provisional application No. 62/383,019, filed on Sep. 2, 2016.

(51) Int. Cl.

| | |
|---|---|
| ***F16L 41/00*** | (2006.01) |
| ***F24F 11/30*** | (2018.01) |
| ***G01L 19/00*** | (2006.01) |
| ***F24F 110/00*** | (2018.01) |
| ***F24F 110/20*** | (2018.01) |
| ***F24F 110/50*** | (2018.01) |

(52) U.S. Cl.

CPC ............. *F16L 41/008* (2013.01); *F24F 11/30* (2018.01); *G01L 19/0007* (2013.01); *F24F 2110/00* (2018.01); *F24F 2110/20* (2018.01); *F24F 2110/50* (2018.01)

(58) Field of Classification Search

CPC ...... F16L 41/008; F24F 11/30; F24F 2110/20; F24F 2110/50; F24F 2110/00; G01L 19/0007

See application file for complete search history.

(56) References Cited

U.S. PATENT DOCUMENTS 4,137,462 A 1/1979 Wyler
4,368,639 A 1/1983 Owens
4,379,406 A 4/1983 Bennewitz et al.
4,393,714 A 7/1983 Schmidt
4,547,079 A * 10/1985 Alamprese ............ G01K 13/02 374/116
4,733,555 A 3/1988 Franks
5,076,108 A 12/1991 Trimarchi
5,652,382 A 7/1997 Nakagawa et al.
5,844,138 A 12/1998 Cota
6,085,576 A * 7/2000 Sunshine ........... G01N 33/0031 340/634
6,122,972 A 9/2000 Crider
6,170,345 B1 1/2001 Kerner
6,241,950 B1 6/2001 Veelenturf et al.
6,568,277 B1 * 5/2003 Emin ................. G01L 19/0007 73/729.2
6,777,120 B2 8/2004 Nelson et al.
D501,799 S * 2/2005 Yamamoto ..................... D10/52
6,852,216 B2 2/2005 Moscaritolo et al.
6,895,803 B2 5/2005 Seakins et al.
6,941,193 B2 9/2005 Frecska et al.
7,049,829 B2 5/2006 Luthi (Continued)

*Primary Examiner* — Ryan D Walsh

(74) *Attorney, Agent, or Firm* — Chernoff, Vilhauer, McClung & Stenzel, LLP

(57) ABSTRACT

A fluid sensing device of a fluid within a duct.

33 Claims, 8 Drawing Sheets

(56) References Cited

U.S. PATENT DOCUMENTS 7,267,002 B2 9/2007 Itakura et al.
7,415,901 B2 * 8/2008 Desrochers .............. G01N 1/26 236/1 B
7,421,911 B2 9/2008 Desrochers et al.
7,498,823 B2 3/2009 Cerutti
7,658,096 B2 * 2/2010 Pinto .................... G01D 11/245 73/29.05
7,661,327 B2 2/2010 Bourgein et al.
8,074,490 B2 * 12/2011 Andrews, Jr. ........ G01N 1/2294 73/31.05
8,201,457 B1 * 6/2012 Halilah ..................... G01F 1/40 73/756
2002/0078733 A1 6/2002 Seakins et al.
2003/0217588 A1 11/2003 Jalbert et al.
2004/0182132 A1 9/2004 Head
2005/0028588 A1 2/2005 Mitter
2005/0066711 A1 3/2005 Discenzo
2005/0126264 A1 * 6/2005 Komninos .............. G01M 3/24 73/40.5 A
2006/0037393 A1 2/2006 Itakura et al.
2006/0042410 A1 * 3/2006 Arar ..................... G01D 11/245 73/866.5
2006/0107774 A1 5/2006 Meyberg
2006/0272392 A1 * 12/2006 Kanare .................. G01N 19/10 73/29.02
2007/0137318 A1 6/2007 Desrochers et al.
2007/0295084 A1 12/2007 Chang et al.
2008/0141797 A1 * 6/2008 Rodriguez ......... G01N 33/1886 73/866.5
2008/0178694 A1 7/2008 Barford et al.
2008/0257037 A1 10/2008 Isogai et al.
2009/0064759 A1 * 3/2009 Pettit ...................... G01K 13/02 73/25.01
2009/0064803 A1 * 3/2009 Pettit ...................... G01D 21/00 73/866.5
2009/0114536 A1 5/2009 Ishiguro et al.
2009/0122834 A1 5/2009 Wang
2011/0138908 A1 6/2011 Liu et al.
2012/0193086 A1 * 8/2012 van Dijk .................. G01K 1/14 165/287
2013/0133420 A1 5/2013 Huang et al.
2013/0139587 A1 6/2013 Le Neel et al.
2014/0334525 A1 * 11/2014 Arensmeier ............. G01K 1/08 374/183
2016/0245516 A1 * 8/2016 Sutton ..................... F23N 3/002
2017/0059442 A1 3/2017 McClanahan et al.

* cited by examiner

ENDCAP FOR DRY PRESSURE INSERTION PROBE

CROSS-REFERENCE TO RELATED APPLICATIONS

This application claims the benefit of U.S. Patent App. No. 62/383,019, filed Sep. 2, 2016.

BACKGROUND OF THE INVENTION

The present invention relates to environmental sensors for detecting characteristics of a fluid in a duct and, more particularly, to a duct mounted environmental sensing unit for detecting a parameter of a fluid in a duct of a heating, cooling, and/or ventilation system.

Temperature and humidity are primary factors in the comfort and quality of an indoor environment. While temperature is important to comfort, the humidity is a substantial factor in determining whether a specific temperature is comfortable. Temperature is commonly regulated as a function of the relative humidity in a space and humidifiers, to control the relative humidity, are often a part of the heating, cooling and ventilation systems of office buildings and industrial plants.

Carbon dioxide ($CO_2$) is a product of human respiration and, while high levels of carbon dioxide are toxic to humans, the concentration of carbon dioxide in an indoor environment is commonly used as a surrogate to indicate the presence of other indoor pollutants that may cause occupants to grow drowsy, have headaches, or function at a lower activity level. Since human respiration is a primary source of carbon dioxide in indoor environments, building codes typically specify the amount of outdoor air to be added to an interior space by the ventilation system on the basis of the occupancy of the space. In the past, ventilation systems commonly maintained a ventilation rate, at all times, that was sufficient for full occupancy of the space. However, heating, cooling, humidifying and moving this volume of air at times when the occupancy is low is wasteful of energy and expensive. Demand controlled ventilation seeks to vary the amount of outside air added to a space to optimize the comfort and wellbeing of occupants and reduce energy consumption under conditions of variable and intermittent occupancy. Carbon dioxide concentration is used as an indicator of the occupancy and as a control parameter for demand controlled ventilation.

Relative humidity may be sensed by a sensor that comprises a polymer that is typically mounted on a porous ceramic plate and has a resistivity that changes as a function of the humidity.

Cota, U.S. Pat. No. 5,844,138, discloses a humidity sensing device that includes a humidity sensitive capacitor comprising part of an oscillator circuit. The frequency of the oscillator is a function of the capacitance of the humidity sensitive capacitor which, in turn, is a function of the relative humidity. The true capacitance of the humidity sensitive capacitor is measured against a known standard and stored in a memory in the humidity sensing device. A microprocessor uses the true capacitance data stored in the memory to correct the relative humidity measurements made with the device to account changes in capacitance resulting from aging or from shipping and handling of the device. A voltage divider network in the humidity sensing device provides temperature compensation for the relative humidity measurements. Cota also discloses an apparatus for supporting the humidity sensor in a stream of fluid flowing in a duct. An enclosure with an attached sleeve is bolted to the exterior of the duct with the sleeve projecting through a hole in the duct's wall. The humidity sensitive capacitor is secured in the end of a tube which passes through the sleeve. A swage nut compresses the sleeve to secure the tube and the humidity sensitive element in the fluid flowing in the duct.

Temperature is commonly measured with a thermistor or a resistance temperature detector (RTD) which exploit the predictable change in electrical resistance of certain materials when they are exposed to changing temperatures. Thermistors and RTDs can be very compact enabling a temperature sensor to be included with the humidity sensor in a mounting similar to that disclosed by Cota.

The presence of carbon dioxide is typically detected with either a chemical sensor or a non-dispersive infrared sensor. Chemical sensors comprise materials that are sensitive to the presence of $CO_2$ and while they typically consume little energy and can be miniaturized, they have a relatively short lifespan and are subject to drift effecting short and long term accuracy of the sensor. Non-dispersive infrared sensors comprise a source and a detector of infrared light disposed at opposite ends of a light tube and an interference filter to prevent light, with exception of light absorbed by the gas molecules of interest, from reaching the detector. A gas to be tested is introduced to the light tube and the absorption of a characteristic wavelength of light is measured to determine the presence of $CO_2$ in the gas. Non-dispersive infrared sensors can be expensive but are commonly used because no other known method works as reliably to detect $CO_2$. A $CO_2$ sensor can be mounted on a wall in the space to be monitored in a manner similar to the installation of a thermostat. The location of the sensor should be selected to expose the sensor to air that is indicative of general conditions within the occupied zone. Locations near doors, windows and air vents or close to where people would regularly sit or stand should be avoided because the $CO_2$ may be locally diluted by air from outside or concentrated by the local activity. A large number of wall mounted sensors are typically required because each sensor is only exposed to the local environment and at least one sensor is typically required in each space. Sensors for humidity and temperature may be combined with the wall mounted $CO_2$ sensor to reduce the number of sensor installations.

$CO_2$ sensors may also be installed on the duct work of an air handling system to detect the concentration of $CO_2$ in the air flowing in the ducts, $CO_2$ sensors are typically located in the duct in which air is returning from a space but may also be mounted in the air intake for the ventilation system to measure the $CO_2$ in the intake air. While a ventilation system comprising a plurality of zones typically incorporates a number of sensors, a duct mounted sensor can serve a plurality of zones reducing the required number of sensors. Duct mounting of the $CO_2$ sensor is best applied where the ventilation system operates continuously and where the return airstream being monitored serves one or more zones that have similar levels of activity and occupancy at similar times.

While the use of such sensing units permits the monitoring and subsequent adjustment of fluid flow in a duct, the sensing units and the sensors themselves tend to collect debris over time which decreases the accuracy of such measurements. Furthermore, with sufficient collection of debris the sensing units should be removed from their installation, the different portions of the sensing units either replaced or cleaned, and reinstalled which is burdensome.

What is desired, therefore, is an environmental sensing unit to enable a plurality of sensors to be installed at single insertion point in a duct of a ventilation system, with a relatively low maintenance requirement.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

Figure 1:
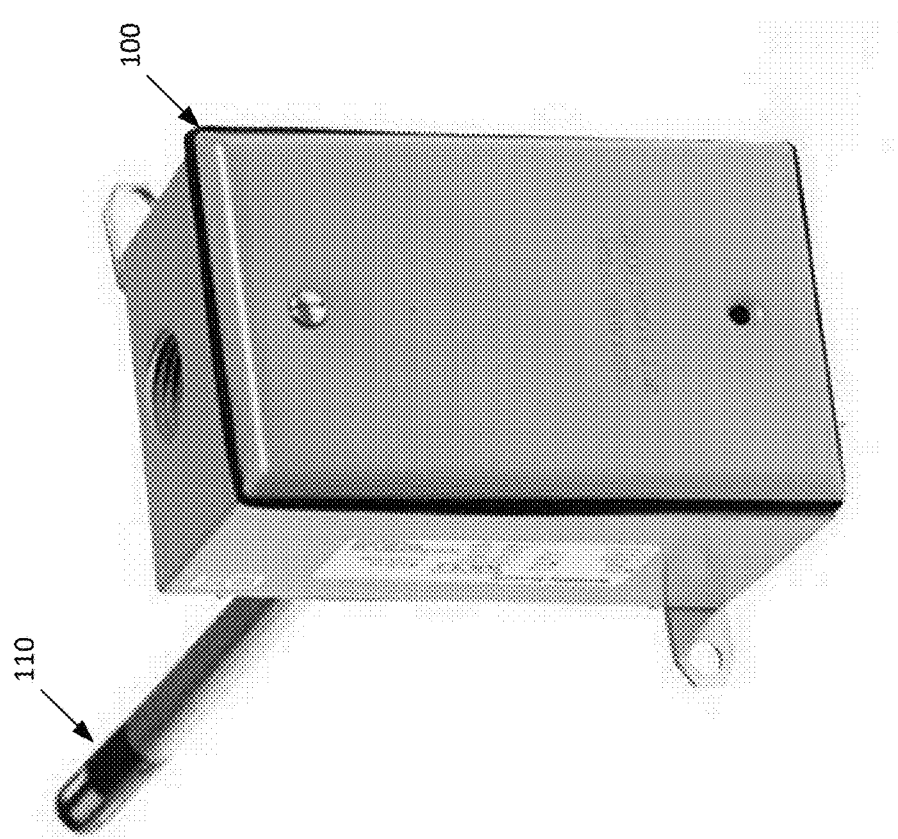
FIG. 1 illustrates a pictorial view of a sensor unit.

Referring to FIG. 1, a sensor unit may include a housing 100 that includes an environmental sensing unit 110 that is mountable on the exterior surface of a wall of a duct to enable sensing of a fluid in the duct. For example, the fluid in the duct may include temperature, humidity, carbon dioxide, carbon monoxide, volatile organic compounds, and smoke. The construction of the sensing unit 110 enables the installation of one or more sensors at a single insertion point in the duct. The sensors of the humidity sensor may be included within the housing and/or sensing unit and/or within the duct while being in contact with fluid within the duct.

Figure 2:
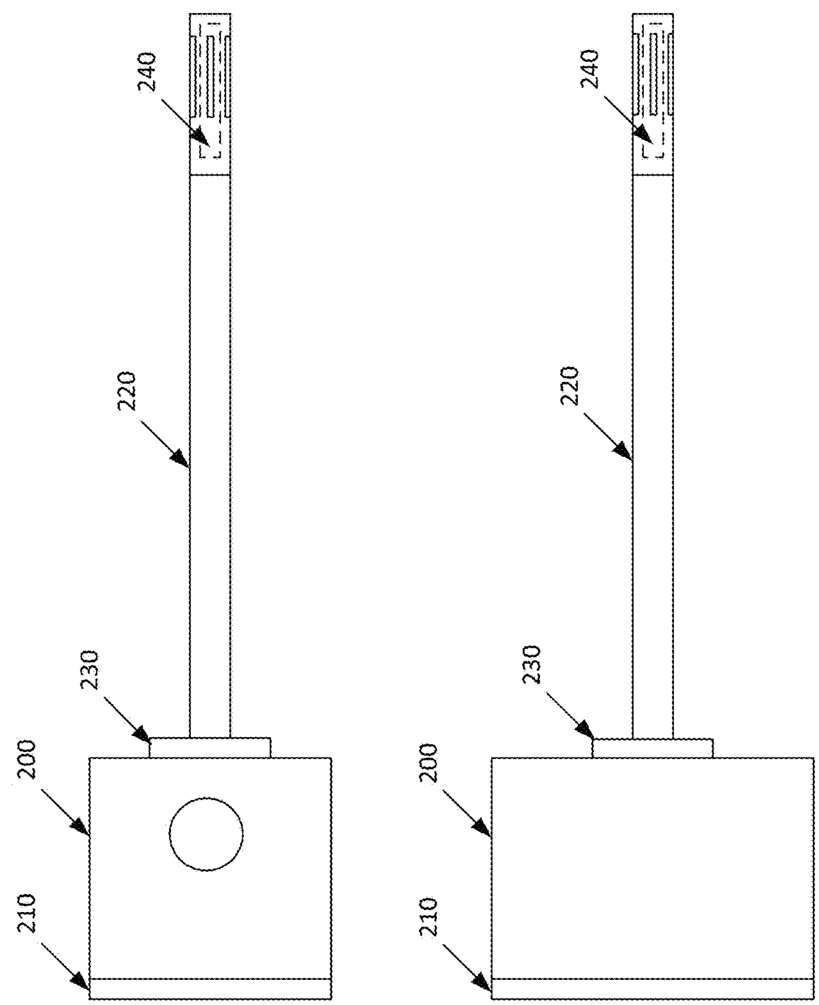
FIG. 2 illustrates two side views of a sensor unit.

Referring also to FIG. 2, the enclosure for the sensing unit generally comprises a housing 200, a removable cover 210, a sensor beam 220, and a mounting plate 230. The mounting plate 230 may be used to secure the sensing unit to a duct with the sensor beam 220 extending therein. Further, the sensor beam 220 is preferably rotatable with respect to the housing 200. One or more sensors 240 may be affixed proximate the projecting end of the sensor beam so that when the enclosure is installed on the duct the sensors are supported in the fluid stream away from the boundary layer adjacent to the housing. Also, one or more sensors may be maintained within the sensor beam 220 and/or the housing 200.

Figure 3:
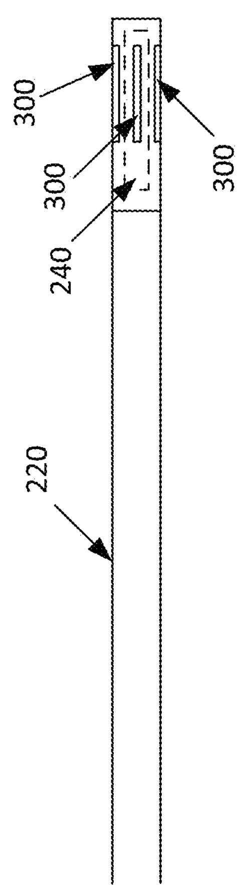
FIG. 3 illustrates an end portion of a sensor tube.

Referring also to FIG. 3, the end of the sensing beam 220 may include a plurality of opposing openings 300 to permit the fluid from within the duct to be sensed by a sensor in fluid communication with the interior of the sensing beam 220. With the openings 300 exposed to the fluid flow in the duct, the openings and the sensor within the sensor beam and/or housing have a tendency to collect debris over time which decreases the accuracy of the measurements. With a sufficient collection of debris over time, the sensing unit will have a tendency to decrease its measurement accuracy. With the decrease in measurement accuracy, the sensing unit and/or the sensor requires periodic maintenance which is burdensome. To decrease the collection of debris over time, a plastic endcap having a diameter sufficiently larger than the diameter of the end portion of the sensing beam may be secured over the end of the sensing beam to cover the openings thereof. The plastic endcap is secured to the end of the sensor beam with a rivet. The fluid within the duct is in fluid communication with the interior of the sensor beam as a result of a serpentine flow pattern around the endcap and into the openings, which decreases the accumulation of debris. Unfortunately, the application of the rivet through the plastic endcap has a tendency to crack the plastic end cap during installation.

Figure 4:
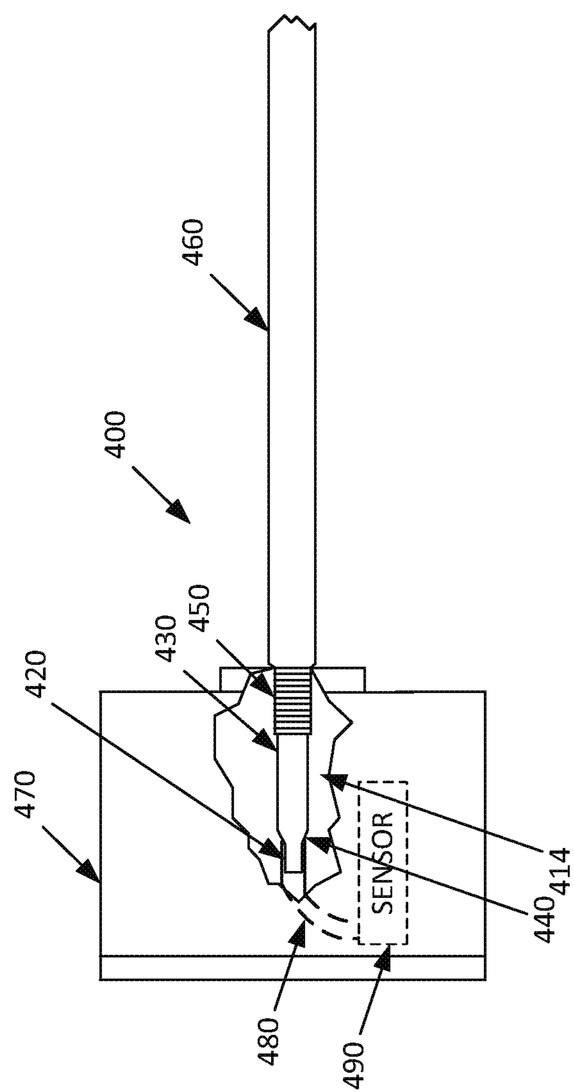
FIG. 4 illustrates an end portion of a sensor tube.

Referring to FIG. 4, a modified end of a sensing beam 400 that fits within a housing 470 may include a tapered portion 410. The tapered portion 410 may include an end portion 420 with a relatively narrow diameter. By way of example, the end portion may have a length of 0.187 inches with a diameter of 0.089 inches. The end portion 420 and the sensing beam 400 preferably do not include any slots or otherwise openings in the sides thereof. The end portion 420 preferably includes an opening in the end thereof. The end portion 420 is suitable for being affixed to a flexible hose connector 480, if desired. By way of example, the flexible hose 480 may be interconnected to a sensor 490 including any suitable electronics thereof enclosed within the housing 470. The end portion 420 is interconnected to a mid-portion 430 by an inclined portion 440. The mid portion is preferably 0.516 inches long with a diameter of 0.150 inches. The mid portion 430 provides a structure for assisting to secure the flexible hose 480 by pressing the end of the flexible hose onto the inclined the portion 440. The mid portion 430 preferably has a smaller diameter than an adjacent threaded portion 450 so that the mid portion 430 is readily inserted within the housing 470 through a threaded opening having a diameter greater than that of the mid portion 430. The threaded portion 450 preferably has unified thread standard 10-32 threads with a length of 0.400 inches. The threaded portion 450 is suitable to engage a threaded opening in the housing 470 to secure the sensing beam 400 to the housing 470. A main portion 460 of the sensor beam 400 adjacent the threaded portion 450 preferably has a larger diameter than the threaded portion 450 so that the threaded portion 450 readily comes to a stop when threaded onto the housing 470. The main portion 460 preferably has a diameter of 0.157 inches. The main portion 460 preferably extends into the duct or other structure. Preferably, the sensor beam is constructed from a metal material.

Figure 5:
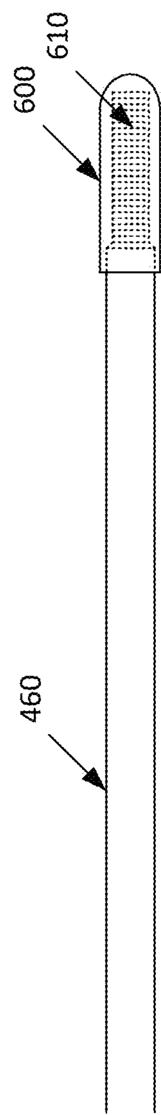
FIG. 5 illustrates an end portion of a sensor tube.

Referring to FIG. 5, an exterior end cap 600 is preferably affixed over the end of the sensor tube on the end extended within the duct. The end cap 600 may be of any suitable construction or configuration. Preferably the end cap is maintained in its position on the end of the sensor tube using only a friction based fit. Preferably, the end cap 600 is constructed from a metal material, such as brass. An end portion 610 of the sensor tube preferably has a threaded end portion, such as uniform thread standard 10-32. The end cap 600 is preferably pressed onto the threaded end portion 460 of the sensor tube until the end cap 600 comes into pressing engagement with the end of the threaded end portion 610 or otherwise an internal end portion of the end cap 600 comes into engagement with the end of the sensor tube, such as the end or the transition between the threaded portion and the adjacent portion of the sensor tube. In this manner, the end cap 600 and sensor tube 460 are configured such that the end cap comes into suitable pressing engagement with the sensor tube, with a predetermined relative position to one another when fully engaged with one another. Preferably, the end cap is configured so that its end thereof does not press against the end of the sensor tube so that end of the sensor tube is not inhibited from sensing the fluid in the duct. As it may be observed, the fluid path of the air in the duct or otherwise will be a serpentine pattern, thus reducing the amount of accumulation of debris. It is further noted that the threaded end portion preferably does not include any openings therein, other than the terminal end of the end portion. Furthermore, the threaded end portion provides a suitable frictional engagement with the end cap 600.

Figure 6:
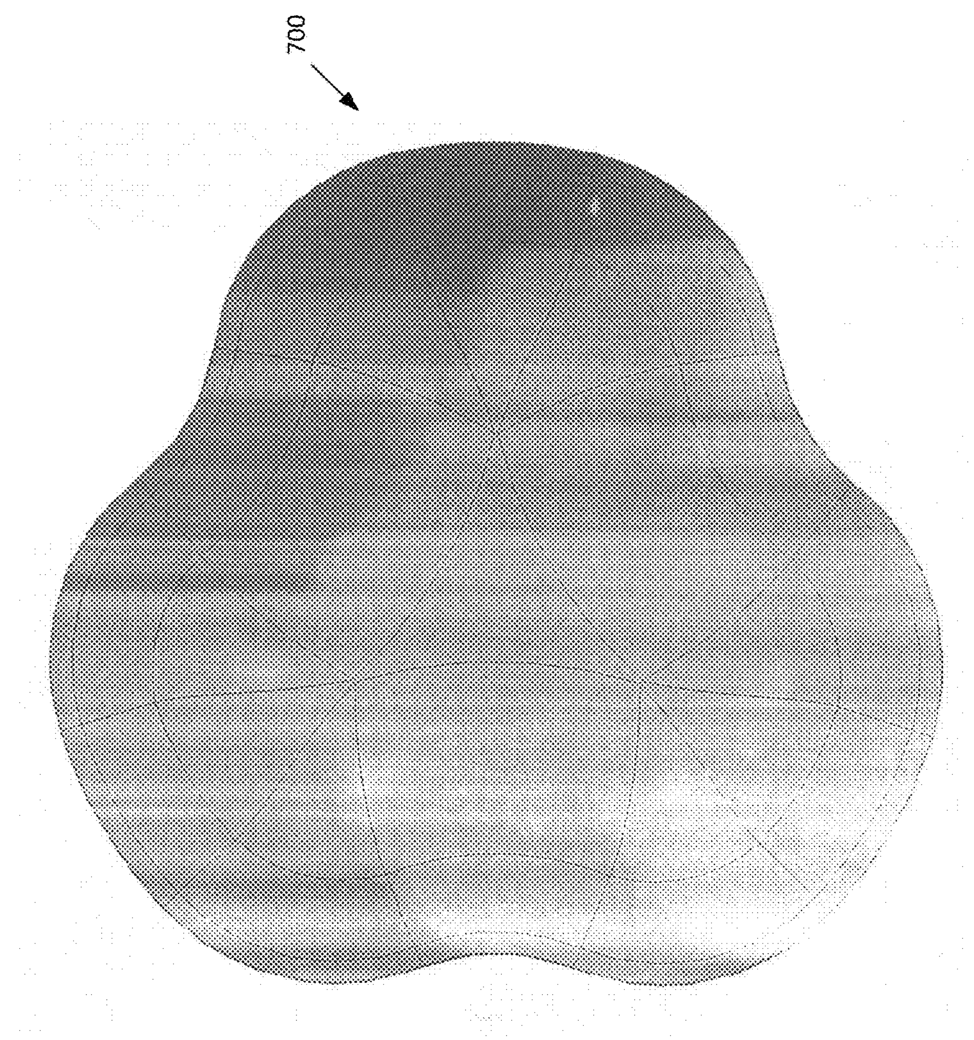
FIG. 6 illustrates an end cap.
Figure 7:
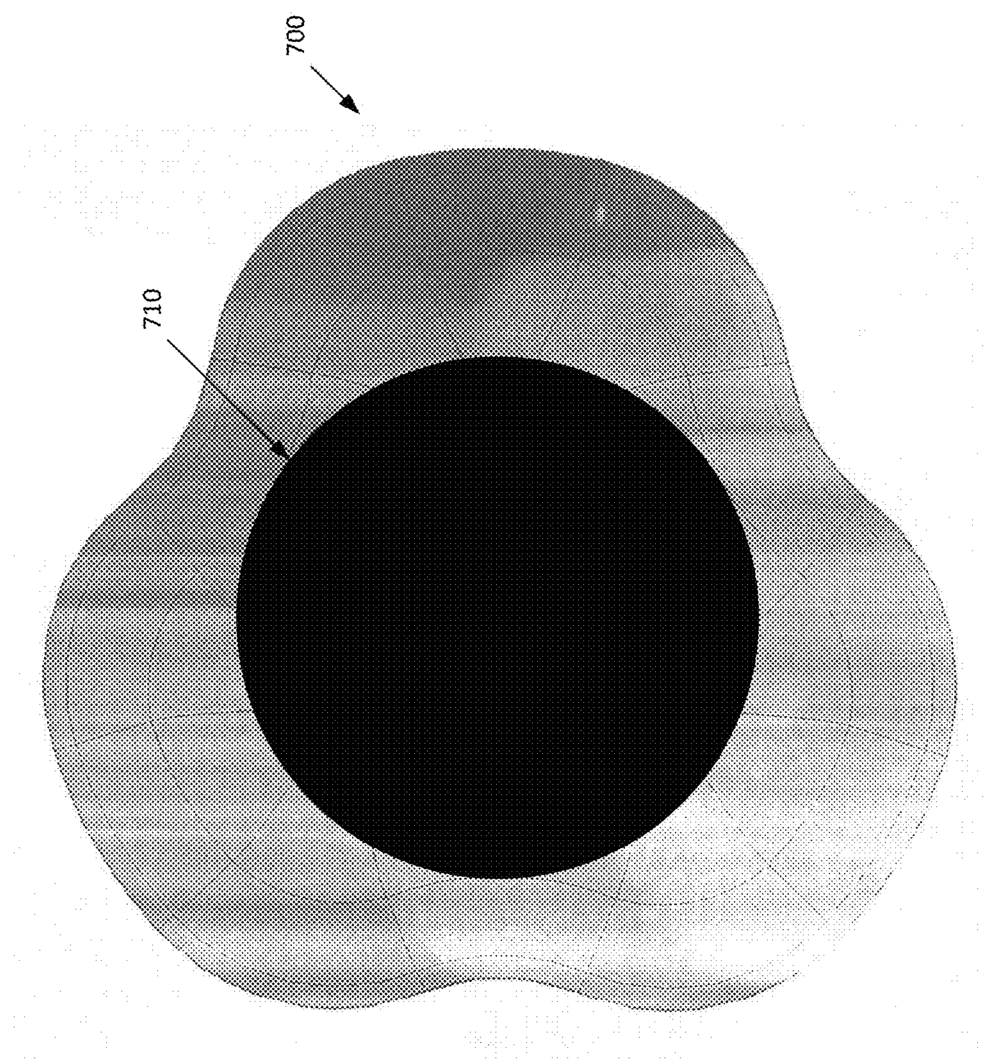
FIG. 7 illustrates an end cap with a sensor tube therein.

Referring to FIG. 6, a cross sectional view of a preferred embodiment of an end cap 700 is illustrated. Preferably, the cross sectional area of the end cap has a trilobular cross sectional area, while other cross sectional shapes may be used, as desired. Referring also to FIG. 7, the trilobular cross sectional area includes three lobes that are sized to each come into pressing engagement with the exterior 710 of the end portion of the sensor tube. In this manner, when engaged with the end portion of the sensor tube three channels that are in fluid communication with the end, and thus the interior, of the sensor tube. Using a set of three channels, as opposed to a different number of channels, readily permits the end cap to be self-centering on the end portion of the sensor tube. Other numbers of channels may likewise be provided, as desired. Preferably, the lobes are in direct contact with no more than 35% of the exterior surface of the end portion of the sensor tube. Preferably, the cross sectional area of the end cap is not symmetrical. Preferably, the cross sectional area of the end cap has a variable width between the exterior of the end portion of the sensor tube and the interior surface of the end cap.

The sensor housing may include a differential pressure sensor where the difference in the pressure is sensed within the sensor tube by a first sensor and the pressure sensed in the duct directly by a second sensor. The differential pressure may be provided via an output from the sensor housing and/or a display included with the sensor housing. In this manner, the output may be provided as a difference in pressure, such as in psi. While the output of differential pressure is useful in characterizing the nature of the fluid flow in the duct, it is also desirable to be able to directly observe the velocity of the fluid flow in the duct. Preferably, the sensor housing includes a selectable switch that provides an output that is a velocity of the fluid in duct via an output from the sensor housing and/or a display included with the sensor housing. The velocity may be calculated based upon the differential pressure, together with the density of the fluid (either calculated, predetermined, or selectable). The velocity may be as a velocity, such as in m/s.

Figure 8:
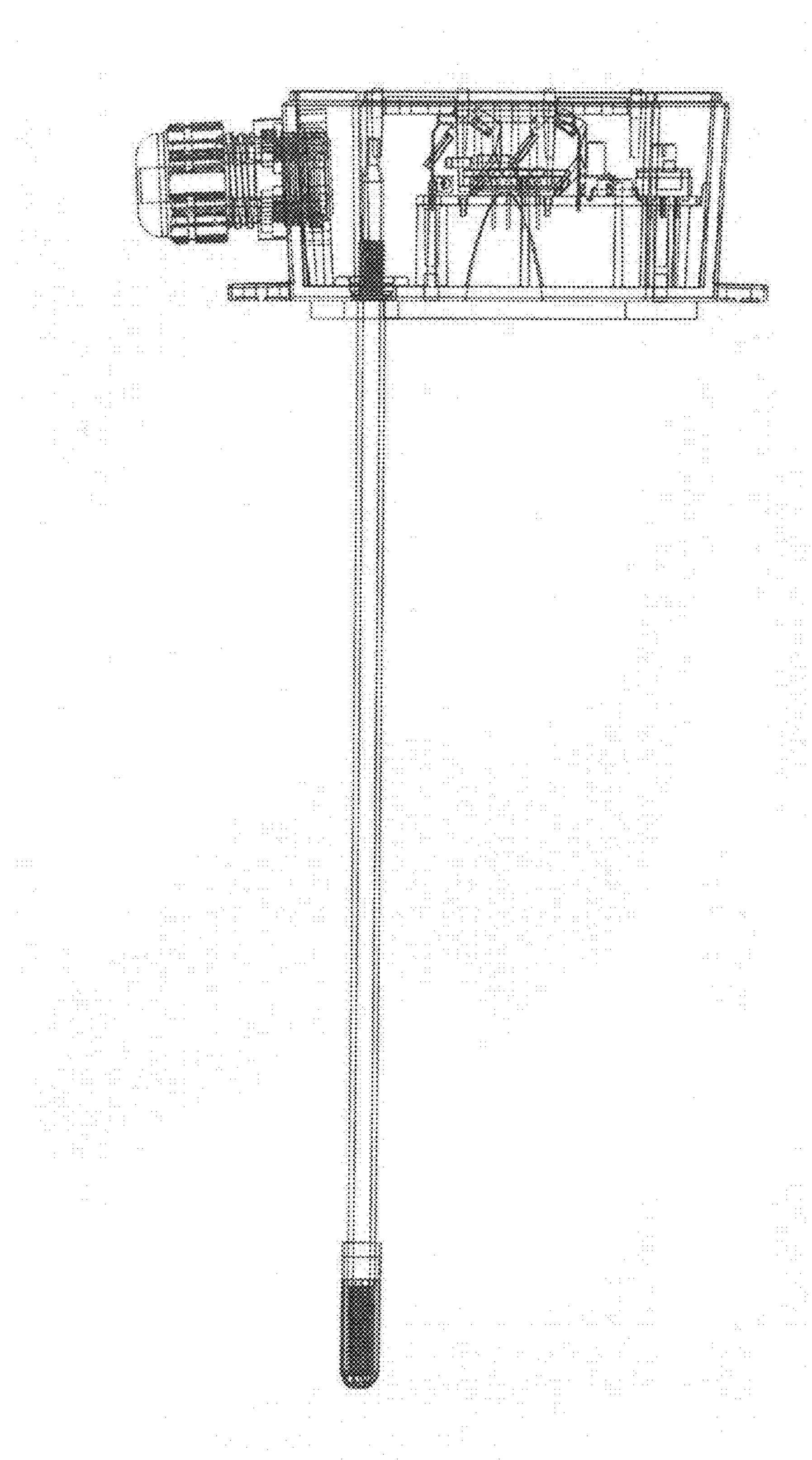
FIG. 8 illustrates an exemplary sensor housing with a sensor tube and an end cap.

Referring to FIG. 8, an exemplary sensor tube with an end cap affixed thereto together with a sensor housing is illustrated.

Preferably, the end cap has a stepped interior surface so that it doesn't bottom out on the end of the sensor tube.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A sensing unit suitable to sense a parameter of a fluid in an interior of a duct defined by a duct wall having an exterior surface and including a portion defining a duct aperture, said sensing unit comprising:

(a) an enclosure including a first enclosure portion including a mounting surface and arrangement for attachment to said exterior surface of said duct wall with said mounting surface abutting said duct wall;

(b) said enclosure including a second enclosure portion attached to said first enclosure portion and arranged to extend through said duct aperture when said mounting surface abuts said duct wall;

(c) said first enclosure portion of said enclosure defining a first threaded opening for rotational engagement with a first threaded portion of said second enclosure portion of said enclosure for said attachment;

(d) said second enclosure portion including a second portion adjacent said first threaded portion, where said second portion has a diameter less a diameter of said first threaded portion;

(e) a flexible tubular connector interconnecting said second portion to a sensor;

(f) said sensor configured to be in fluid connection with said fluid in said interior of said duct.

2. The sensing unit of claim 1 further comprising said sensor including at least one of a temperature sensor, a humidity sensor, a carbon dioxide sensor, a carbon monoxide sensor, a volatile organic compound sensor, a pressure sensor, a velocity sensor, and a smoke sensor.

3. The sensing unit of claim 1 further comprising said sensor being maintained within said first enclosure portion.

4. The sensing unit of claim 1 further comprising said first enclosure portion including an openable cover.

5. The sensing unit of claim 1 further comprising a third portion of said second enclosure portion adjacent to said first threaded portion, where a diameter of said third portion is greater than said diameter of said first threaded portion, where said third portion is at an opposite end of said first threaded portion than said second portion.

6. The sensing unit of claim 5 wherein said diameter of said third portion is greater than a diameter of said first threaded opening.

7. The sensing unit of claim 1 wherein said second enclosure portion is free from including any openings therein except for one opening at the opposing ends thereof.

8. The sensing unit of claim 1 wherein said second enclosure portion is constructed from metal material.

9. A sensing unit suitable to sense a parameter of a fluid in an interior of a duct defined by a duct wall having an exterior surface and including a portion defining a duct aperture, said sensing unit comprising:

(a) an enclosure including a first enclosure portion including a mounting surface and arrangement for attachment to said exterior surface of said duct wall with said mounting surface abutting said duct wall;

(b) said enclosure including a second enclosure portion attached to said first enclosure portion and arranged to extend through said duct aperture when said mounting surface abuts said duct wall;

(c) said second enclosure portion defining an end opening at an end thereof farthest distant from said first enclosure portion;

(d) said second enclosure portion free from defining any other openings in a side of said second enclosure portion other than said opening at an end thereof (e) an end cap engaged over an end portion of said second enclosure portion and said end cap engaged over said end opening;

(f) a sensor configured to be in fluid connection with said fluid in said interior of said duct maintained through said end opening within said second enclosure portion.

10. The sensing unit of claim 9 wherein said first enclosure portion of said enclosure is rotationally engaged with said second enclosure portion.

11. The sensing unit of claim 9 wherein said end cap location is maintained with interference friction securement.

12. The sensing unit of claim 9 wherein said end cap is constructed from metal material.

13. The sensing unit of claim 9 wherein said end portion of said second enclosure portion defines exterior threads.

14. The sensing unit of claim 9 wherein said end cap is free from being in pressing engagement with a terminal end surface of said second enclosure portion when fully engaged therewith.

15. The sensing unit of claim 9 wherein said end cap includes a trilobular cross sectional area.

16. The sensing unit of claim 15 wherein said end cap is in direct contact with no more than 35% of the exterior surface of said second enclosure portion directly underneath said end cap.

17. The sensing unit of claim 9 wherein said end cap does not include a symmetrical cross sectional area.

18. A sensing unit to sense a parameter of a fluid in an interior of a duct defined by a duct wall having an exterior surface and including a portion defining a duct aperture, said sensing unit comprising:

(a) an enclosure including a first enclosure portion including a mounting surface and arrangement for attachment to said exterior surface of said duct wall with said mounting surface abutting said duct wall;

(b) said enclosure including a second enclosure portion attached to said first enclosure portion and arranged to extend through said duct aperture when said mounting surface abuts said duct wall;

(c) said second enclosure portion supporting a first pressure sensor and a second pressure sensor;

(d) a sensor included within said enclosure sensing a first pressure from said first pressure sensor and a second pressure from said second pressure sensor;

(e) said enclosure including a display that selectively provides one of a differential pressure measure and a velocity measure based upon said first pressure and said second pressure.

19. A sensing unit suitable to sense a parameter of a fluid in an interior of a duct defined by a duct wall having an exterior surface and including a portion defining a duct aperture, said sensing unit comprising:

(a) an enclosure including a first enclosure portion including a mounting surface and arrangement for attachment to said exterior surface of said duct wall with said mounting surface abutting said duct wall;

(b) said enclosure including a second enclosure portion detachably attachable to said first enclosure portion and arranged to extend through said duct aperture when said mounting surface abuts said duct wall;

(c) said first enclosure portion of said enclosure defining a first opening for engagement with a first portion of said second enclosure portion of said enclosure for said attachment;

(d) said second enclosure portion including a second portion adjacent said first portion, where said second portion has a diameter less a diameter of said first portion;

(e) a flexible tubular connector interconnecting said second portion to a sensor;

(f) said sensor in configured to be in fluid connection with said fluid in said interior of said duct.

20. The sensing unit of claim 19 further comprising said sensor including at least one of a temperature sensor, a humidity sensor, a carbon dioxide sensor, a carbon monoxide sensor, a volatile organic compound sensor, a pressure sensor, a velocity sensor, and a smoke sensor.

21. The sensing unit of claim 19 further comprising said sensor being maintained within said first enclosure portion.

22. The sensing unit of claim 19 further comprising said first enclosure portion including an openable cover.

23. The sensing unit of claim 19 further comprising a third portion of said second enclosure portion adjacent to said first portion, where a diameter of said third portion is greater than said diameter of said first portion, where said third portion is at an opposite end of said first portion than said second portion.

24. The sensing unit of claim 23 wherein said diameter of said third portion is greater than a diameter of said first opening.

25. The sensing unit of claim 19 wherein said second enclosure portion is free from including any openings therein except for one opening at the opposing ends thereof.

26. The sensing unit of claim 19 wherein said second enclosure portion is constructed from metal material.

27. A sensing unit suitable to sense a parameter of a fluid in an interior of a duct defined by a duct wall having an exterior surface and including a portion defining a duct aperture, said sensing unit comprising:

(a) an enclosure including a first enclosure portion including a mounting surface and arrangement for attachment to said exterior surface of said duct wall with said mounting surface abutting said duct wall;

(b) said enclosure including a second enclosure portion attached to said first enclosure portion and arranged to extend through said duct aperture when said mounting surface abuts said duct wall;

(c) said second enclosure portion defining an end opening at an end thereof farthest distant from said first enclosure portion;

(d) an end cap engaged over an end portion of said second enclosure portion and said end cap engaged over said end opening;

(e) a sensor configured to be in fluid connection with said fluid in said interior of said duct maintained through said end opening within said second enclosure portion;

(f) wherein said end cap is in direct contact with no more than 35% of the exterior surface of said second enclosure portion directly underneath said end cap.

28. The sensing unit of claim 27 wherein said first enclosure portion of said enclosure is rotationally engaged with said second enclosure portion.

29. The sensing unit of claim 27 wherein said end cap location is maintained with interference friction securement.

30. The sensing unit of claim 27 wherein said end cap is constructed from metal material.

31. The sensing unit of claim 27 wherein said end portion of said second enclosure portion defines exterior threads.

32. The sensing unit of claim 27 wherein said end cap is free from being in pressing engagement with a terminal end surface of said second enclosure portion when fully engaged therewith.

33. The sensing unit of claim 27 wherein said end cap includes a trilobular cross sectional area.

* * * * *